April 9, 1935.  F. N. MANLEY  1,997,467

METHOD AND PRODUCT FOR SELECTIVE CONVERSION ARTICLES

Filed Dec. 29, 1931

Inventor,
F. N. Manley.
By Jas. T. Richmond
Attorney

Patented Apr. 9, 1935

1,997,467

UNITED STATES PATENT OFFICE 1,997,467

METHOD AND PRODUCT FOR SELECTIVE CONVERSION ARTICLES

Frank Nason Manley, New Brunswick, N. J., assignor to Johnson & Johnson, New Brunswick, N. J., a corporation of New Jersey Application December 29, 1931, Serial No. 583,776

2 Claims. (Cl. 32—33)

The invention provides a novel chain or connected series of elements for ultimate selective conversion into dental rolls, applicators, powder puffs, and such like single use articles.

The nature of the invention consists in forming from cotton slivers, or equivalent material, an elongated rod-like article, compressing and sizing, or otherwise fixating, the cross-sectional area at spaced intervals defined by intermediate or connecting portions that are free from size or other fixating coatings and are unconfined and fluffy, for the purpose and with the result that the rod-like shape, when severed into units, will produce inexpensive or throwaway articles, such as, for example, dental rolls, applicators and powder puffs.

The preferred method and formative product will be clearly understood from the following description taken in connection with the accompanying drawing, forming a part hereof, wherein Figure 1 is an elevational view of a stick or chain of elements for selective conversion into dental rolls or inexpensive or single use powder puffs and applicators for medicaments, as by severing the stick or chain at appropriate intervals.

Figure 1:
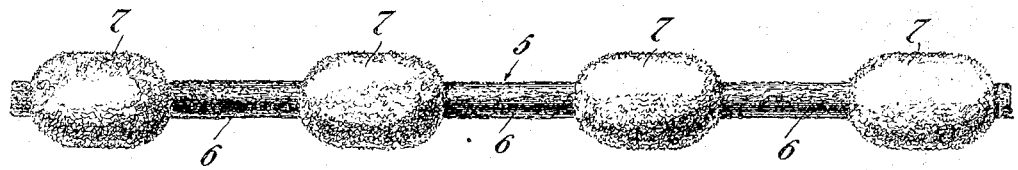
Figure 2:
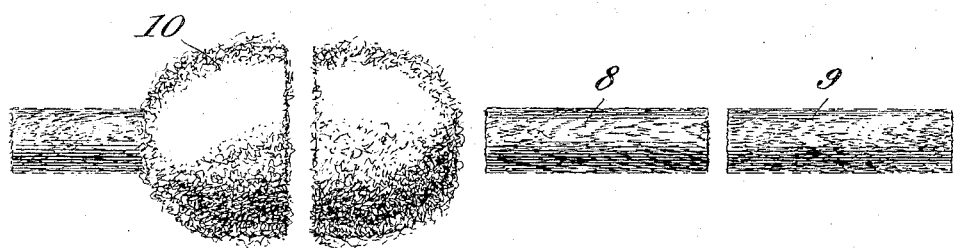
Fig. 2 is a similar view showing some of the units in severed relation.
Figure 3:
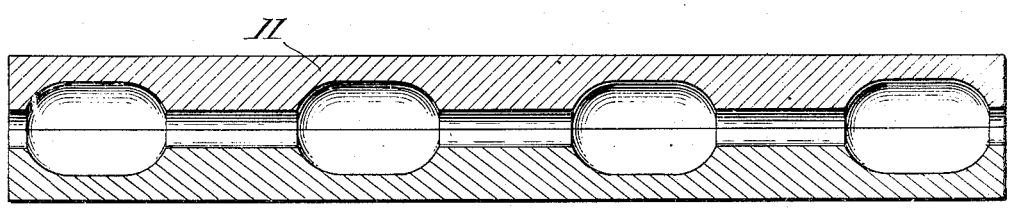
Fig. 3 is a diagrammatic illustration of suitable means for forming the stick or chain of elements.

According to the invention, slivers of cotton are formed into a cylindrical shape or rod 5 of appropriate cross-sectional area and characterized by relatively stiff and fixated sections 6 separated by free and unconfined fluffy sections 7. By dividing the stick or chain of elements into individual sections or units as by transverse lines of severance there results, selectively, such conversion products as the dental rolls and applicators 8 and 9 and the powder puffs 10.

The invention may be practiced by shaping a mass of cotton slivers to rod form, sizing or otherwise fixating and coating the shape at predetermined spaced intervals, and then compressing or molding the same under conditions for leaving the uncoated portions free and unconfined or in their original fluffy state, as by the action of a die 11. When the shape is thoroughly dry and otherwise finished, it may be selectively divided in any conventional way.

What is claimed as new, is:—

1. The method herein described which consists in arranging a mass of cotton slivers in elongated form, placing the same in a mold, compressing intermediate portions to rod-like form and leaving the other portions fluffy, and then sizing the said intermediate portions.

2. As an article of manufacture, an elongated mass of soft absorbent fibrous material, the structure being characterized by compressed and sized portions and unsized and fluffy portions in alternate order of arrangement, the structure having the further characteristic that it optionally provides for conversion into powder puffs or of medicament applicators, either or both, according to the point of severance.

FRANK NASON MANLEY.